(12) United States Patent
Kurakawa et al.

(10) Patent No.: US 8,862,296 B2
(45) Date of Patent: Oct. 14, 2014

(54) ELECTRIC VEHICLE

(75) Inventors: Yukinori Kurakawa, Wako (JP);
Masaru Nakayama, Wako (JP); Makoto Hasegawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 390 days.

(21) Appl. No.: 13/433,573

(22) Filed: Mar. 29, 2012

(65) Prior Publication Data

US 2012/0259491 A1 Oct. 11, 2012

(30) Foreign Application Priority Data

Mar. 31, 2011 (JP) ................. 2011-079748

(51) Int. Cl.
*B60L 9/00* (2006.01)
*B60L 11/18* (2006.01)
*B62K 5/027* (2013.01)
*B62K 5/025* (2013.01)
*B60K 1/04* (2006.01)

(52) U.S. Cl.
CPC ............ *B60L 11/1877* (2013.01); *Y02T 90/127* (2013.01); *B60K 2001/0416* (2013.01); *B60L 11/1874* (2013.01); *B60L 2200/12* (2013.01); *B62K 5/027* (2013.01); *B60L 11/1864* (2013.01); *B62K 2204/00* (2013.01); *Y02T 10/642* (2013.01); *Y02T 10/7005* (2013.01); *Y02T 90/121* (2013.01); *Y02T 10/7061* (2013.01); *Y02T 10/7094* (2013.01); *B62K 5/025* (2013.01); *B60K 1/04* (2013.01); *B60Y 2200/122* (2013.01); *Y02T 10/7233* (2013.01); *Y02T 10/7066* (2013.01); *B60L 11/1816* (2013.01); *B60L 2240/421* (2013.01); *Y02T 90/14* (2013.01); *B60L 2210/12* (2013.01); *B60L 11/1868* (2013.01)
USPC .............................................. 701/22

(58) Field of Classification Search
USPC ................................................ 701/22, 36
See application file for complete search history.

(56) References Cited

U.S. PATENT DOCUMENTS

| 5,460,234 | A | 10/1995 | Matsuura et al. |
| 2009/0002038 | A1 | 1/2009 | Boerstler et al. |
| 2009/0020352 | A1 | 1/2009 | Horii et al. |

FOREIGN PATENT DOCUMENTS

| JP | 05-161221 | * | 6/1993 | .............. B60L 15/00 |
| JP | 05-161221 | A | 6/1993 | |

* cited by examiner

*Primary Examiner* — Kim T Nguyen
(74) *Attorney, Agent, or Firm* — Squire Patton Boggs (US) LLP

(57) ABSTRACT

A rear body of an electric vehicle can include rear body frames attached in a vertically swingable manner with respect to a body frame and a chassis attached to the rear body frames by a pivot shaft on a vehicle forward side in a vertically swingable manner. Front and rear batteries are located on the rear body frames, and a motor and rear wheels are supported on the chassis. The front and rear batteries are housed in a battery case fixed on the rear body frames. A PDU as a battery control device, is located on a vehicle forward side of the battery case. A contactor, having a function to open and close the connection between the front and rear batteries and the PDU, is located on a lateral face of the battery case.

20 Claims, 11 Drawing Sheets

ELECTRIC VEHICLE

BACKGROUND

1. Field

The present invention relates to a vehicle such as an electric three-wheeled vehicle which is run by driving a pair of left and right rear wheels by the driving power of a motor.

2. Description of the Related Art

In the past, there have been known saddle-ride type electric three-wheeled vehicles in which a front fork attached to the forward side of a body frame supports a front wheel and a rear body vertically swingable and transversely tiltable with respect to the body frame is attached on the rearward side of the body frame and a pair of left and right rear wheels driven by a motor are supported on the rear body.

Patent Literature 1 (JP-A-Hei5-161221) discloses an electric three-wheeled vehicle (see FIG. 1) in which a rear body includes a rear body frame attached to a body frame in a transversely tiltable manner. A chassis is supported in a vertically swingable manner with respect to the rear body frame and a box-type battery case, for housing at least batteries, and is attached on the rear body frame. A power unit including a motor is attached on the chassis.

However, in the technology described in Patent Literature 1, since relatively large electric components such as a PDU as a motor control device (motor driver) and a battery control device are housed in the battery case and above the batteries, there is a problem that the battery case size tends to be large, particularly its overall height. In addition, since the motor driver, battery control device and the like generate heat when they operate, an electric fan, air guide passage or the like is needed to cool the inside of the battery case, which may necessitate an increase in the number of components or an increase in the vehicle size.

SUMMARY

An object of embodiments of the present invention is to address the above problem of the conventional technique and provide an electric vehicle in which the size of a battery case located on a rear body can be small, and the number of components can be decreased.

According to a first feature, the present invention can include an electric vehicle which runs by driving a pair of left and right rear wheels by rotary driving power of a motor supplied with electric power from batteries. A rear body includes rear body frames attached in a transversely tiltable manner with respect to a body frame. A chassis can be attached to the rear body frames by a pivot shaft on a vehicle forward side in a vertically swingable manner. At least the batteries are located on the rear body frames; the motor and the rear wheels are supported on the chassis. The batteries are housed in a battery case fixed on the rear body frames. A PDU, as a battery control device, is located on a vehicle forward side of the battery case. A contactor having a function to open and close a connection between the batteries and the PDU is located on a lateral face of the battery case.

A second feature is that the battery case can be supported to be sandwiched between a pair of left and right rear body frames oriented along a vehicle longitudinal direction. A PDU supporting frame which is curved in a projecting form toward a vehicle forward direction and connects the left and right rear body frames is provided, and the PDU is supported by the PDU supporting frame.

A third feature is that the chassis can be journaled to the rear body frames by the pivot shaft located on the vehicle forward side in a vertically swingable manner. The motor is located behind the pivot shaft and in a vehicle forward position of the chassis.

A fourth feature is that a down regulator for decreasing the voltage of an external power supply to charge the batteries is located under the battery case.

A fifth feature is that a lower frame surrounding a lower part of the battery case is provided on bottoms of the rear body frames. The down regulator is attached to the lower frame under the battery case.

A sixth feature is that the batteries include a front battery and a rear battery which are located close to each other in a vehicle longitudinal direction and in the battery case. A rear bottom face under the rear battery is higher than a front bottom face under the front battery so that the rear battery is in a higher position than the front battery.

A seventh feature is that the down regulator for decreasing the voltage of the external power supply to charge the batteries is located under the rear bottom face.

An eighth feature is that the rear body frames can have a charge port bracket for mounting a battery charge port to be connected with the external power supply to charge the batteries.

A ninth feature is that the contactor is fixed on a contactor supporting stay extending from the battery case in a vehicle transverse direction. The charge port bracket is located under the contactor.

A tenth feature is that monitoring boards for monitoring the batteries are attached to upper surfaces of the batteries. A BMU, for collecting information from the monitoring boards, is housed in the battery case on a vehicle forward side of the batteries.

An eleventh feature is that the PDU is located above a relative rotation part to enable the rear body frames to tilt transversely with respect to the body frame and at front ends of the rear body frames so that a mounting surface of a board housed therein, on which various electric components are mounted, is oriented toward a vehicle forward direction.

According to the first feature, the batteries are housed in the battery case fixed on the rear body frames. The PDU, as a battery control device, is located on the vehicle forward side of the battery case. The contactor, having a function to open and close the connection between the batteries and the PDU, is located on a lateral face of the battery case. As a result, the battery case can be small because the large PDU and contactor are located outside the battery case.

Also, since the PDU is located outside the battery case and at the front of the rear body, the PDU is easily cooled by wind when the vehicle is moving. This eliminates the need for installing an electric fan for cooling the PDU, so the body structure can be simplified and the number of components can be decreased. Also, since the PDU and contactor are close to each other, the length of a high-voltage harness for connecting them can be shortened.

According to the second feature, the battery case is supported to be sandwiched between a pair of left and right rear body frames oriented along the vehicle longitudinal direction. The PDU supporting frame, which is curved in a projecting form toward the vehicle forward direction and which connects the left and right rear body frames, is provided. The PDU is supported by the PDU supporting frame, so the large and heavy PDU can be stably supported on the vehicle forward side of the battery case.

According to the third feature, the chassis is journaled to the rear body frames by the pivot shaft located on the vehicle forward side in a vertically swingable manner and the motor is located behind the pivot shaft and in a vehicle forward position of the chassis. As a result, the distance between the PDU located in front of the battery case and the motor can be shortened. This shortens the distance of a three-phase cable for supplying power from the PDU to the motor and reduces transmission loss and noise contamination and also decreases the influence on the three-phase cable when the chassis swings vertically.

According to the fourth feature, the down regulator for decreasing the voltage of the external power supply to charge the batteries is located under the battery case. As a result, the down regulator is located so as to be easily exposed to a wind during vehicle operation, thereby increasing the heat radiation efficiency of the down regulator.

According to the fifth feature, a lower frame surrounding the lower part of the battery case is provided on the bottoms of the body frames and the down regulator is attached to the lower frame under the battery case. As a result, the battery case and the down regulator are prevented from being influenced by an external force. In addition, the down regulator can be fixed stably.

According to the sixth feature, the batteries include a front battery and a rear battery which are located close to each other in the vehicle longitudinal direction and in the battery case. The rear bottom face under the rear battery is higher than the front bottom face under the front battery so that the rear battery is in a higher position than the front battery, so it is possible to install the front battery in a lower position while providing a sufficient clearance to prevent interference between the chassis and the battery case even when the chassis swings vertically. This lowers the center of gravity of the vehicle body.

According to the seventh feature, the down regulator for decreasing the voltage of the external power supply to charge the batteries is located under the rear bottom face. By using the space created by a level difference on the bottom of the battery case effectively, the down regulator can be installed in a way not to cause interference with the chassis.

According to the eighth feature, the rear body frames have a charge port bracket for mounting a battery charge port to be connected with the external power supply to charge the batteries. As a result, the battery charge port can be installed in a relatively high place to facilitate connection work. If a down regulator is attached to the bottom of the battery case, the wire for connecting the battery charge port and the down regulator can be shortened.

According to the ninth feature, the contactor is fixed on the contactor supporting stay extending from the battery case in the vehicle transverse direction and the charge port bracket is located under the contactor. The charge port and the contactor are located close to each other, thereby improving ease of assembly and maintenance. The length of the wire for connecting the contactor and charge port can also be shortened.

According to the tenth feature, the monitoring boards for monitoring the batteries are attached to the upper surfaces of the batteries. A BMU for collecting information from the monitoring boards is housed in the battery case on a vehicle forward side of the batteries. As a result, the battery case size can be decreased by housing the small BMU and monitoring boards inside the battery case while placing the large PDU and contactor outside the battery case.

According to the eleventh feature, the PDU is located above the relative rotation part to enable the rear body frames to tilt transversely with respect to the body frame and at the front ends of the rear body frames so that the mounting surface of the board housed therein, on which various electric components are mounted, is oriented toward the vehicle forward direction. As a result, the PDU is less susceptible to transverse tilting motion of the rear body frames and cooled more stably.

DETAILED DESCRIPTION

Figure 1:
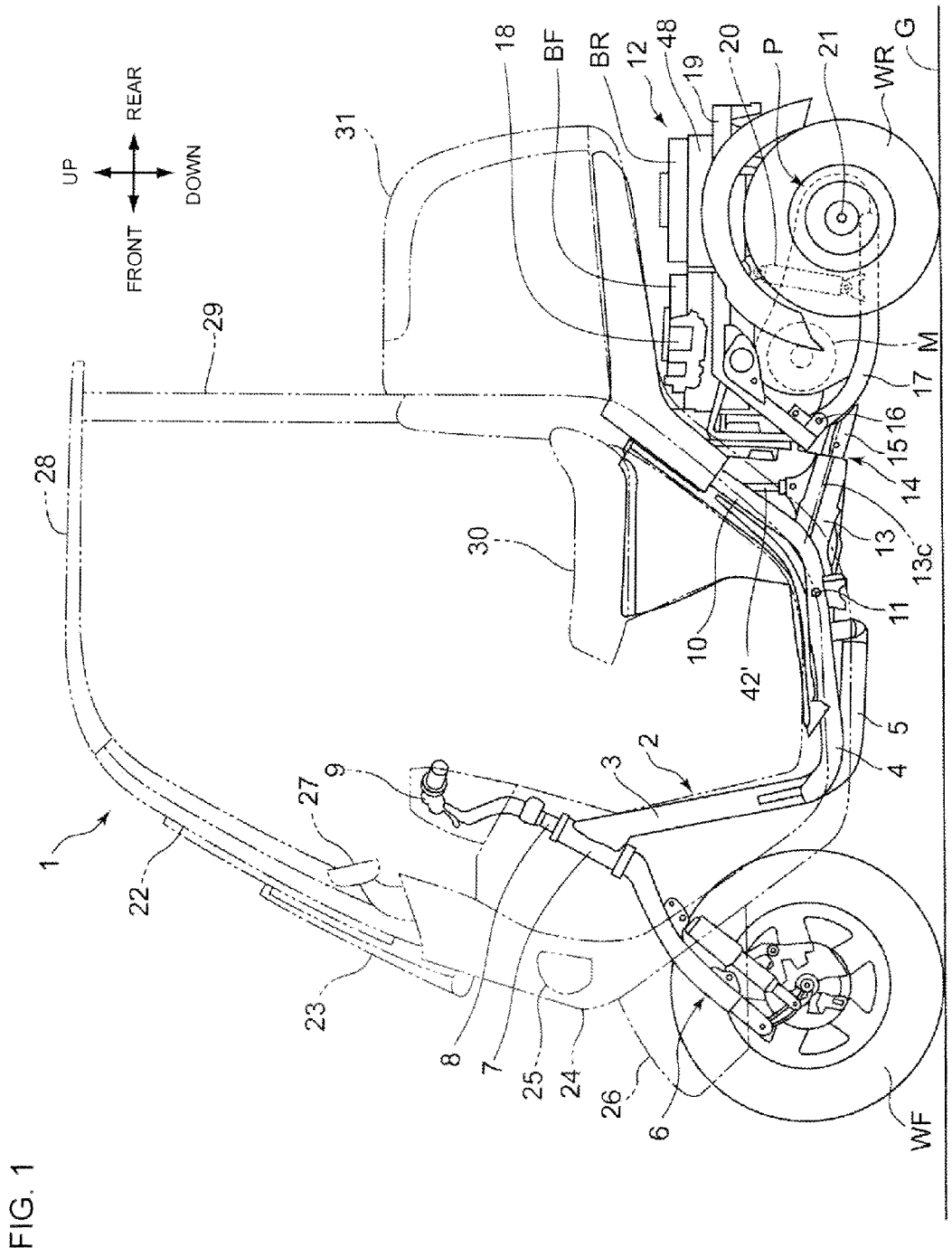
FIG. 1 is a side view of an electric three-wheeled vehicle according to an embodiment of the present invention.

Next, the preferred embodiments of the present invention will be described in detail referring to drawings. FIG. 1 is a side view of a vehicle, such as an electric three-wheeled vehicle 1, according to an embodiment of the present invention. The electric three-wheeled vehicle 1 is a saddle-ride type vehicle which runs by driving a pair of left and right rear wheels WR by the rotary driving power of a motor M. A head pipe 7 for pivotally supporting a steering stem 8 in a rotatable manner is attached to the front end of a main frame 3 which constitutes a body frame 2. A steering handlebar 9 is attached to the top of the steering stem 8 and a bottom link type suspension (front fork) 6 for pivotally supporting a front wheel WF in a rotatable manner is attached to its bottom.

An under frame 5, in the center in the vehicle transverse direction, is joined to the lower part of the main frame 3 and side frames 4 extending in the vehicle rearward direction on the left and right are also attached to it. The rear end of the under frame 5 is joined to the side frames 4 by a connecting pipe oriented along the vehicle transverse direction. The rear parts of the pair of left and right side frames 4 are joined to rear frames 10 extending in the vehicle rearward direction, respectively.

The front end of a rear body supporting unit 13 is supported on the side frames 4 behind and above the under frame 5 by a pivot shaft 11. The upper part of the rear body supporting unit 13 is suspended from rear frames 10 by a rigid bar 42' located in the center in the vehicle transverse direction. A tilting member 15, which can rotate around a rotary shaft 13c oriented along the vehicle longitudinal direction with its front inclined upward, is journaled to the rear end of the rear body supporting unit 13. A damper such as a Neidhardt type damper (not shown), which gives a damper effect to the rotation of the tilting member 15 in a relative rotation part 14, is housed inside the rear body supporting unit 13. The tilting member 15 is fixed on a rear body 12 including a pair of left and right rear wheels WR and the motor M.

The rear body 12 can include rear body frames 19 fixed on the tilting member 15, and a chassis 17 supported on the pivot shaft 16 of the rear body frames 19 in a vertically swingable manner. The rear of the chassis 17 is suspended from the rear body frames 19 by a pair of left and right rear shock units 20.

Due to this structure, the electric three-wheeled vehicle 1 provides a rear wheel suspension to swing the chassis 17 vertically and also enables the body frame 2 to do tilting motion (banking motion) on the relative rotation part 14 with respect to the rear body 12 to turn and run while the left and right rear wheels WR are on the road surface G.

A power unit P, including the motor M, is attached to the chassis 17. The rotary driving power of the motor M is transmitted from the axle 21 protruding left and right in the vehicle transverse direction of the power unit P to the rear wheels WR through various transmission mechanisms which will be described later.

A front high-voltage battery BF and a rear high-voltage battery BR, which supply power to the motor M, are located on the rear body frames 19. The front battery BF and rear battery BR, which are the same in shape, virtually a rectangular parallelepiped, are housed in a battery case 48 attached to the rear body frames 19. A contactor 18, as an electric component, is attached to the lateral face of the battery case 48 on the left of the front battery BF in the vehicle transverse direction. The contactor 18 has a function to open and close the connection between the front and rear batteries BF and BR and the motor M.

A front cowl 24, with a headlight 25, is located on the vehicle forward side of the head pipe 7. A pair of left and right rearview mirrors 27, a windshield 22 and an electric wiper 23 for the windshield 22 are attached to the upper part of the front cowl 24. A front fender 26 is attached above the front wheel WF. The upper end of the windshield 22 is joined to a roof member 28 which functions as a rain hood for an occupant and the rear of the roof member 28 is joined to a pillar 29. A seat 30 is located under and in front of the pillar 29 and a trunk 31 is located behind the seat 30. A rear body cover (not shown), including a mudguard for the rear wheels WR, can be attached above the rear body 12.

Figure 2:
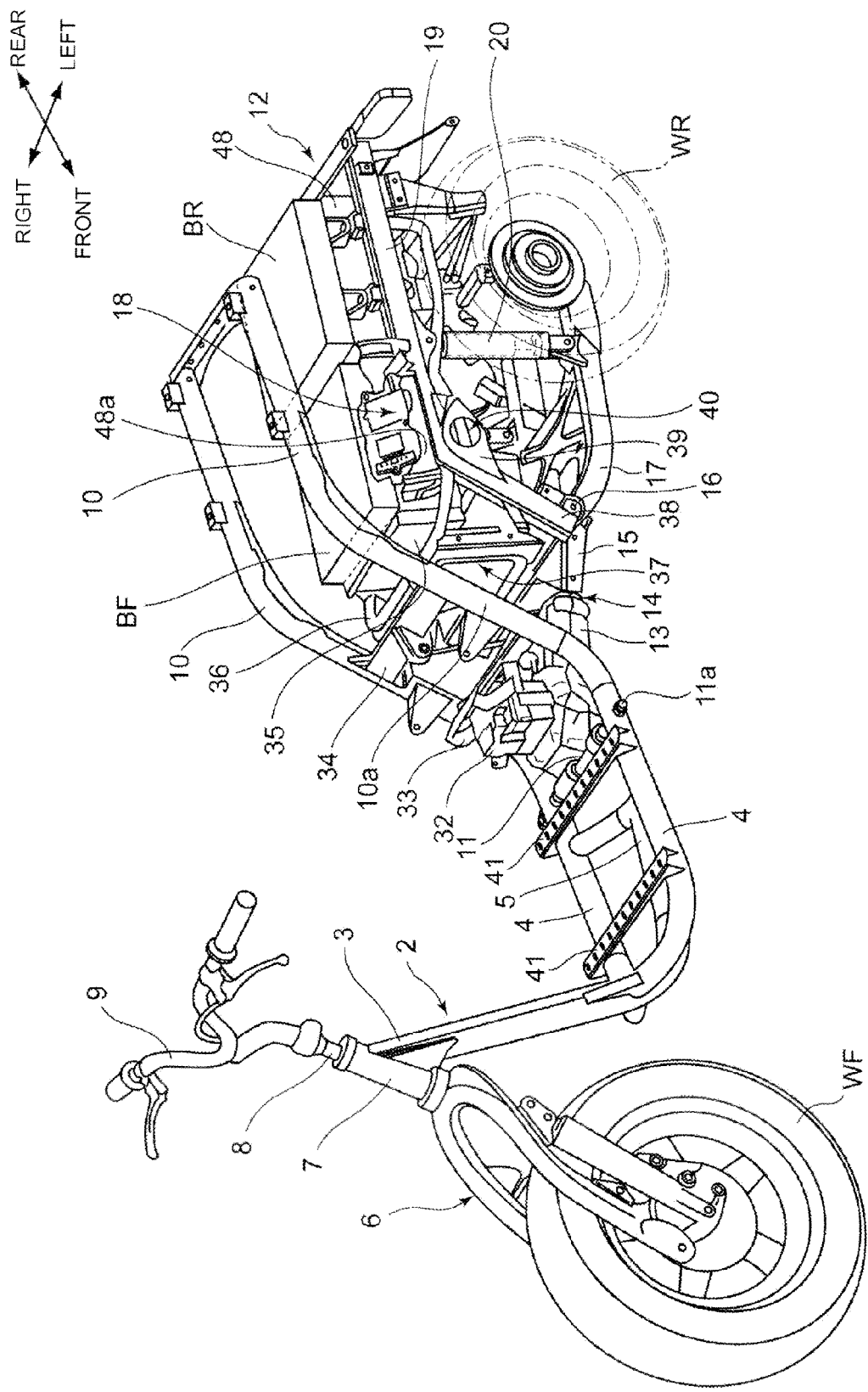
FIG. 2 is a perspective view of the electric three-wheeled vehicle with the exterior parts removed.

FIG. 2 is a perspective view of the electric three-wheeled vehicle 1 with the exterior parts removed. The same reference signs as the above denote the same or equivalent elements. Two supporting members 41 for supporting a foot rest floor (not shown) are located along the vehicle transverse direction on the upper faces of the pair of left and right side frames 4 joined to the main frame 3. The pivot shaft 11 is located behind the rear supporting member 41 in a way to penetrate the left and right side frames 4 and fixed by fastening members 11 from outside in the vehicle transverse direction.

A low-voltage battery 32, which supplies power to lamp units, etc. is located above the rear body supporting unit 13 supported by the pivot shaft 11. The low-voltage battery 32 is supported by a battery stay 33 fixed on the standing portions 10a of the rear frames 10 curving upward behind the side frames 4. The standing portions 10a are connected with each other by a cross pipe 34 oriented along the vehicle transverse direction. The upper end of the rigid bar 42' (see FIG. 3) is pivotally supported in the center of the cross pipe 34 in the vehicle transverse direction.

The rear body frames 19 are integral with a pair of left and right connecting frames 38 which are fixed on the tilting member 15, and oriented toward the rearward and upward direction of the vehicle. The tilting angle of the connecting frames 38 is virtually the same as that of the standing portions 10a of the rear frame 10. The battery case 48, which houses the front battery BF and rear battery BR, is fixed in a way to be sandwiched between the rear body frames 19 as a pair of left and right square pipes. The battery case 48 is so formed that the rear battery BR is located in a higher position than the front battery BF.

A plate-like BMU 35, which is somewhat thick, is located adjacently in front of the battery case 48. The BMU 35 is an electric component which has a function to collect information from monitoring boards 42 (see FIG. 3), for monitoring the front and rear batteries BF and BR. A PDU supporting frame 36 for connecting the left and right connecting frames 38 is provided in front of the BMU 35. The PDU 37 as a motor control device or motor driver is supported in front of the battery case 48 and BMU 35 by the PDU supporting frame 36.

The contactor 18 is fixed on the left of the front battery BF in the vehicle transverse direction by a contactor supporting stay 48a extending laterally of the battery case 48. A battery charge port bracket 39 with a mounting hole 40, for mounting a battery charge port (not shown), is fixed in the bent portion between the rear body frame 19 and connecting frame 38.

The chassis 17 has a structure in which a pair of left and right arm members which pivotally support the lower ends of the rear shock units 20 are connected with each other by a plate-like base for supporting the power unit P and is so structured as to be able to vertically swing around the pivot shaft 16 with respect to the rear body frames 19.

Figure 3:
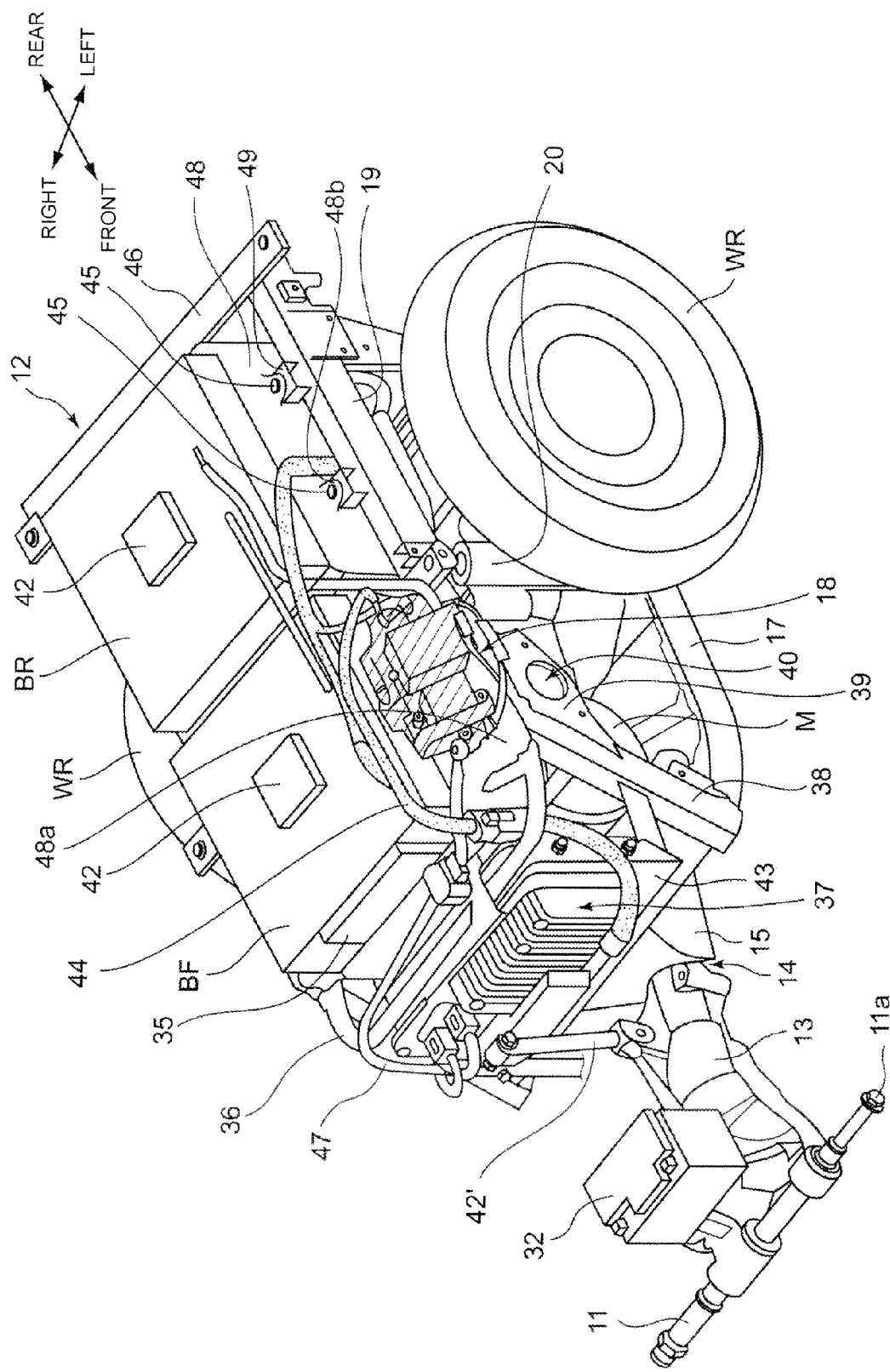
FIG. 3 is a perspective view of a rear body.
Figure 4:
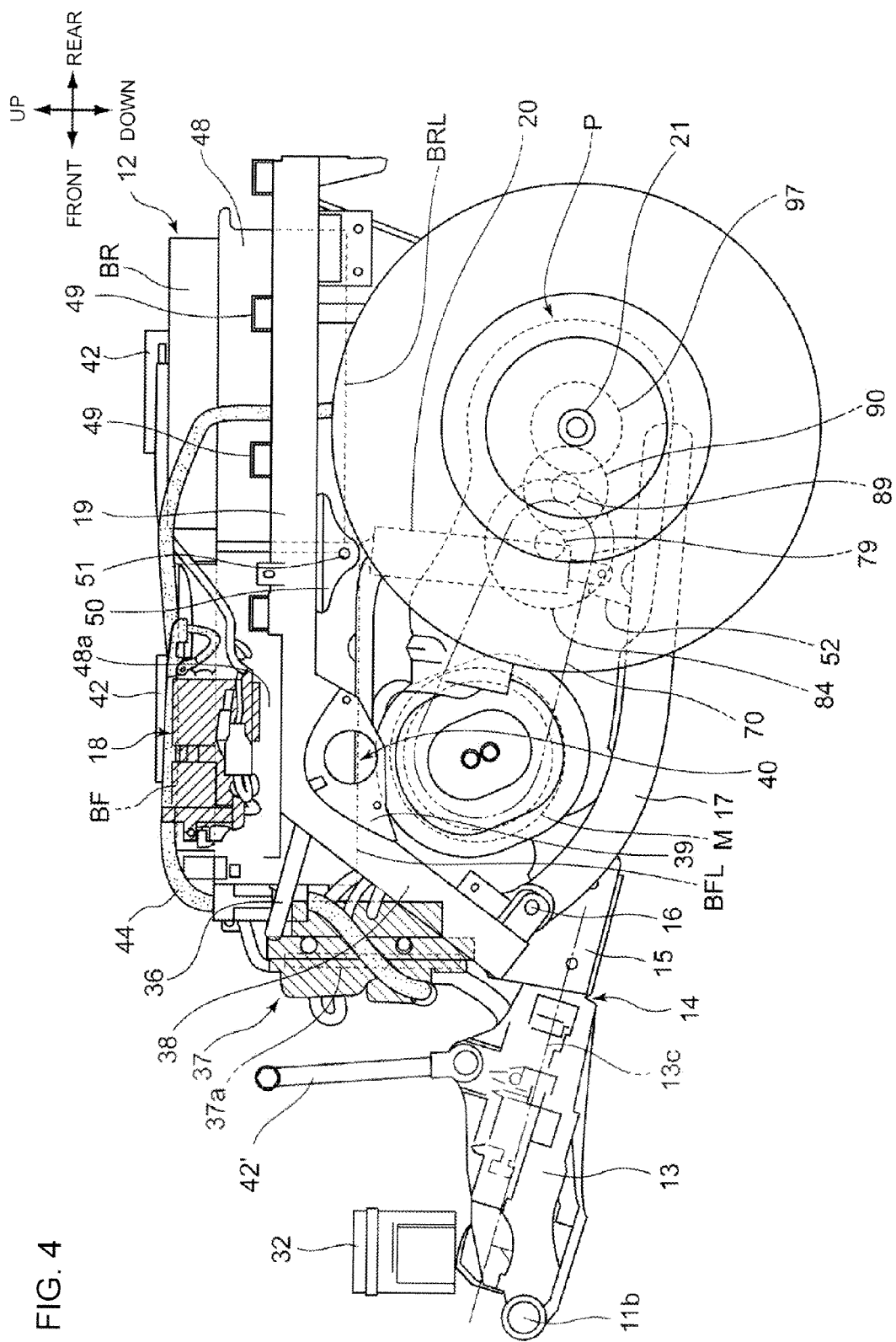
FIG. 4 is a left side view of the rear body.
Figure 5:
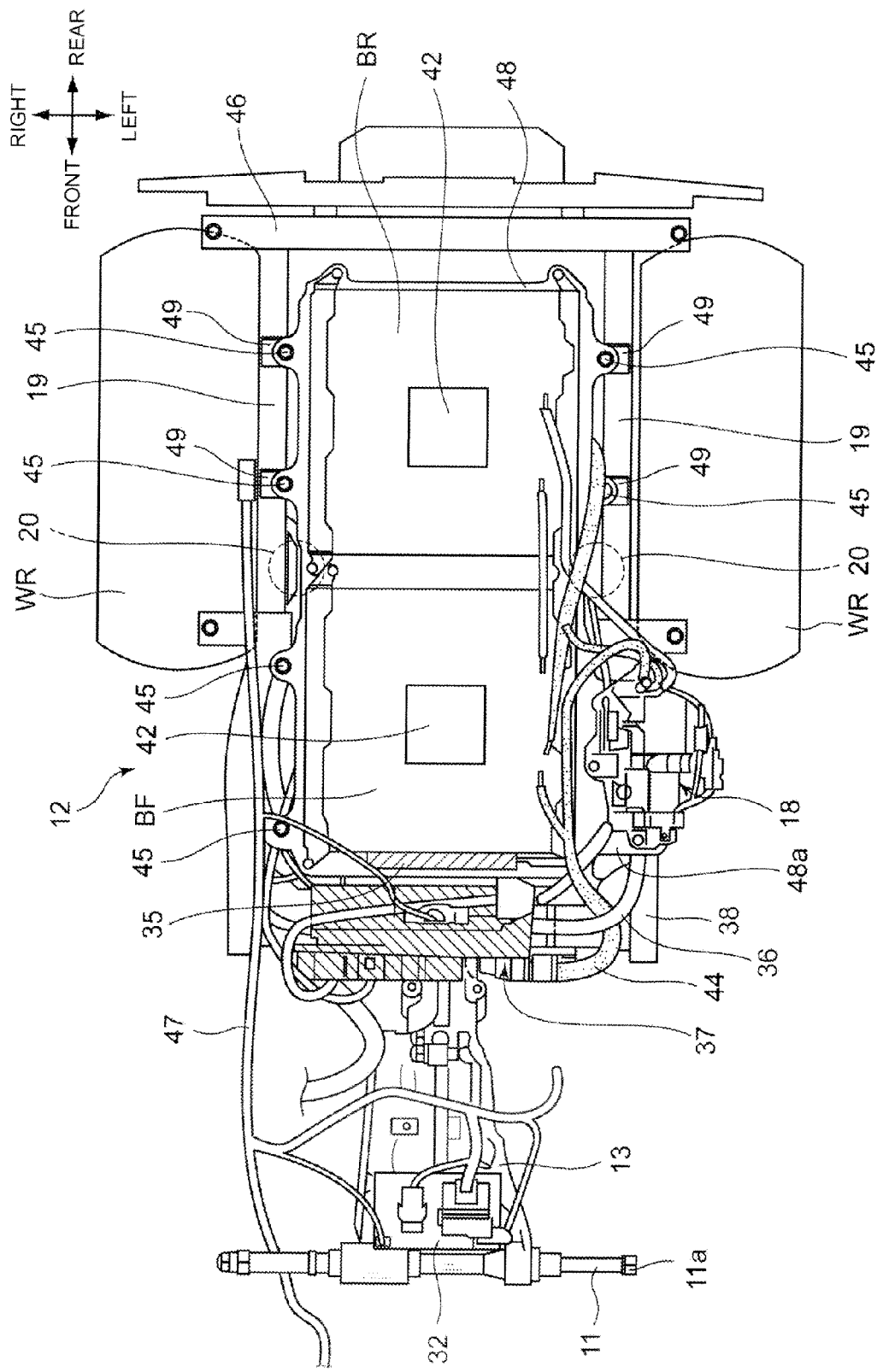
FIG. 5 is a plan view of the rear body.
Figure 6:
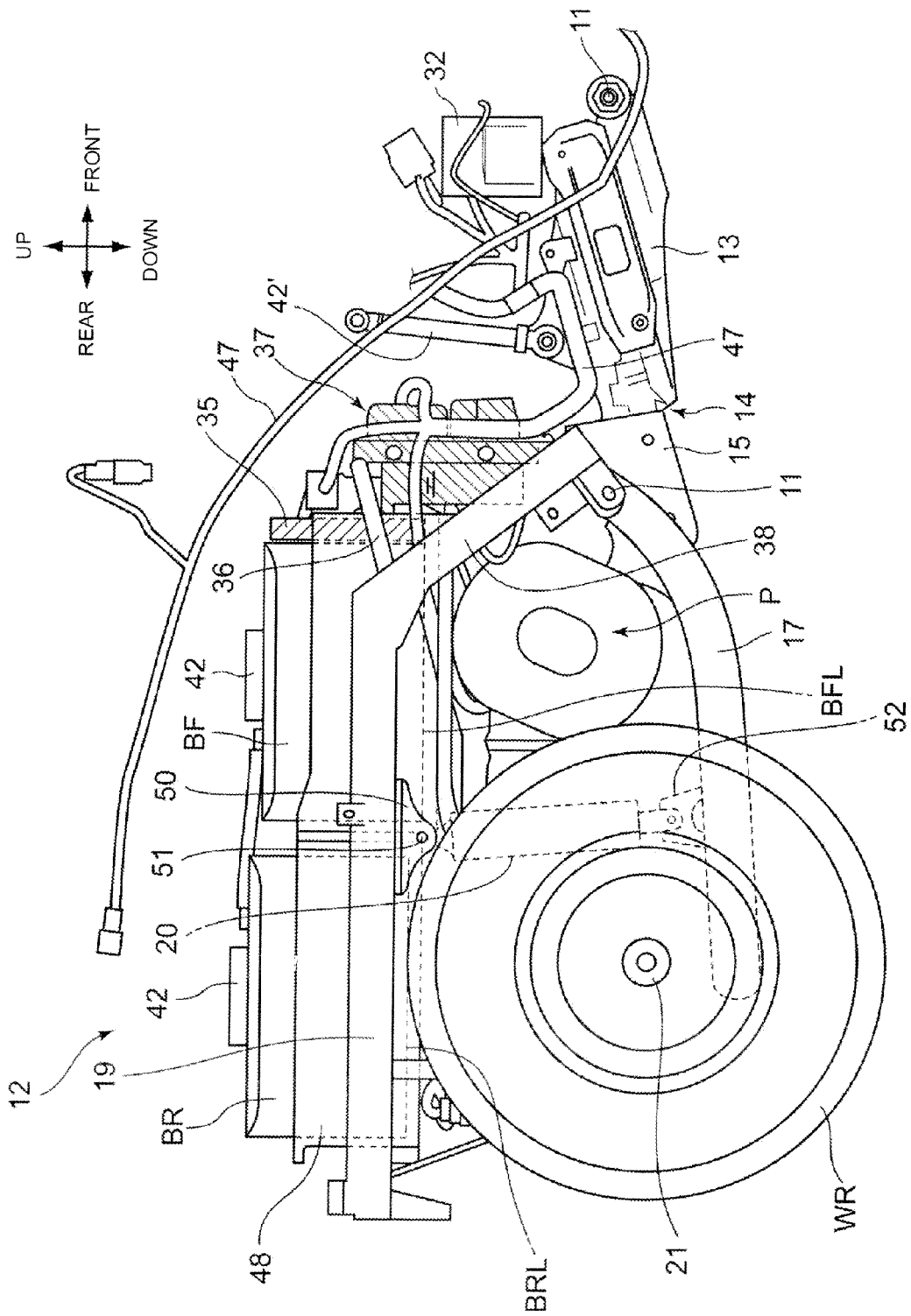
FIG. 6 is a right side view of the rear body.

FIG. 3 is a perspective view of the rear body 12. FIG. 4 is a left side view thereof, FIG. 5 is a plan view thereof and FIG. 6 is a right side view thereof. The same reference signs as the above denote the same or equivalent elements. The battery case 48 is held on mounting bases 49 formed on the rear body frames 19 with fastening members 45 passed in a vehicle vertical direction through the plate-like stays 48b protruding from the lateral sides of the battery case 48. The rear ends of the pair of left and right rear body frames 19 are connected with each other by a connecting member 46 oriented along the vehicle transverse direction.

The upper part of the PDU 37 is supported by the PDU supporting frame 36, which is curved in a projecting form toward the vehicle forward direction. Its lower part is held on a PDU supporting plate 43 supported by the connecting frames 38. The PDU 37 is connected to a low-voltage harness 47 and a high-voltage harness 44 connected to the contactor 18. A plurality of cooling fins are formed on the front face of the PDU 37 and they are located at the front end of the rear body 12 so that they are easily exposed to a wind during vehicle operation, ensuring high heat radiation efficiency in the PDU 37.

The contactor 18, supported by the contactor supporting stay 48a, is inclined so that the surface of a virtually square component constituting the contactor 18 is oriented upward on a lateral side of the vehicle. This makes it possible to effectively utilize the space created between the lateral face of the battery case 46 and the upper surface of the rear body frame 19 to mount the contactor 18. This can suppress the amount of lateral or upward protrusion of the contactor 18.

The monitoring boards 42 in the form of a thin plate, are located on the upper surfaces of the front battery BF and rear battery BR. The BMU 35 is on the vehicle forward side of the front battery BF and housed in the battery case 48. Thus, in the electric three-wheeled vehicle 1 according to this embodiment, while the small BMU 35 and monitoring boards 42 are housed inside the battery case 48 housing the front and rear batteries BF and BR, the large PDU 37 and contactor 18 are located outside the battery case 48 to make the battery case 48 compact.

Since the PDU 37 is located on the vehicle forward side of the battery case 48 and at the front of the rear body, it is easily exposed to a wind during vehicle operation, ensuring high heat radiation efficiency. This eliminates the need for installing an electric fan for cooling the PDU 37, so the body structure is simplified and the number of components is decreased. Also, since the contactor 18 is located on the front and lateral side of the battery case 48, the maintainability of the contactor 18 is improved without an increase in the size of the battery case 48. Furthermore, since the PDU 37 and contactor are close to each other, the length of the high-voltage harness for connecting them can be shortened.

Referring to FIG. 4, the power unit P transmits the rotary driving power of the motor M to the axle 21 through a belt converter type continuously variable transmission V belt 70 (see FIG. 8), a centrifugal clutch 84, a counter shaft 89 with a counter gear 90, and a differential mechanism 97 of the rear wheel WR. The axes of these components are arranged from the vehicle forward side in the following order: the motor M, centrifugal clutch 84, counter shaft 89, and axle 21.

The PDU 37 is located at the front ends of the rear body frames 19 and above the tilting member 15. Consequently, the PDU 37 is less influenced by transverse tilting motions of the rear body frames 19 so that it is cooled stably. Also the PDU 37 is located so that the mounting surface of the virtually rectangular board 37a housed therein, on which various electric components are mounted, is oriented toward the vehicle forward direction, which permits it to be cooled more effectively.

The upper end of the rear shock unit 20 is journaled to the through hole 51 of a supporting member 50 attached to the bottom surface of the rear body frame 19 and the other or lower end is journaled to a supporting member 52 attached to the upper surface of the arm part of the chassis 17.

Referring to the left and right side views of FIGS. 4 and 6, the motor M is located behind and near the PDU 37. More specifically, the motor M is located behind the pivot shaft 16 of the chassis 17 and under the front battery BF. This shortens the distance of the three-phase cable (not shown) for supplying power from the PDU 37 to the motor M and reduces transmission loss and noise contamination and also decreases the influence on the three-phase cable when the motor M swings vertically together with the chassis 17.

The front battery BF is located in a lower position than the rear battery BR, thereby lowering the center of gravity of the rear body. Accordingly, as for the bottom face of the battery case 48, the rear bottom face BRL is in a higher position than the front bottom face BFL.

A through hole through which the pivot shaft 11 passes is provided at the front end of the rear body supporting unit 13. The rigid bar 42' attached to the rear body supporting unit 13 is converted into an expandable/contractable shock unit so that the rear body can swing vertically without the need for a vertical swinging mechanism on the rear body side.

Figure 7:
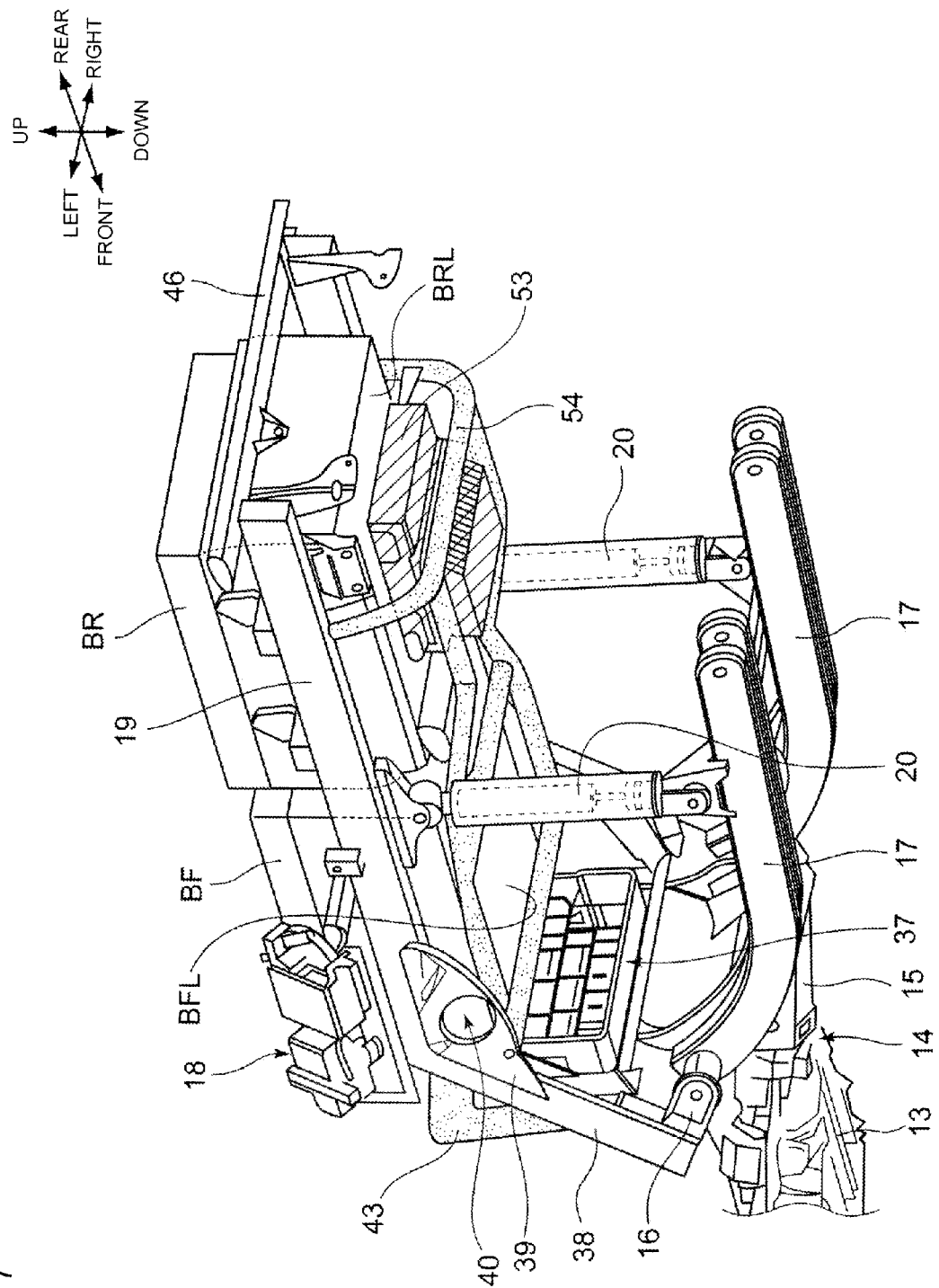
FIG. 7 is a perspective view of the rear body as seen from behind the vehicle body and below.

FIG. 7 is a perspective view of the rear body 12 as seen from behind the vehicle body and below. The same reference signs as the above denote the same or equivalent elements. As mentioned above, in this embodiment, the rear bottom face BRL of the battery case 48 is in a higher position than its front bottom face BFL so that the rear battery BR is in a higher position than the front battery BF. In this embodiment, a down regulator 53, which decreases the voltage of an external power supply to charge the front and rear batteries BF and BR, is installed under the rear bottom face BRL.

Due to this configuration, heat radiation by external air is easily ensured and also the down regulator 53 can be located in a position not to cause interference when the chassis 17 swings upward. The down regulator 53 and a round-pipe lower frame 54 (indicated by pointillism in the drawing) located under the front and rear batteries BF and BR are provided on the lower surfaces of the rear body frames 19. The down regulator 53 can be fixed on the lower frame 54.

The lower frame 54 has a function to make the down regulator 53 and battery case 48 less susceptible to an external force.

Also, as illustrated in FIG. 4, when the down regulator 53 is configured as mentioned above, it is near the charge port bracket 39 for mounting the battery charge port so the wire for connecting the battery charge port and the down regulator 53 can be shortened.

Figure 8:
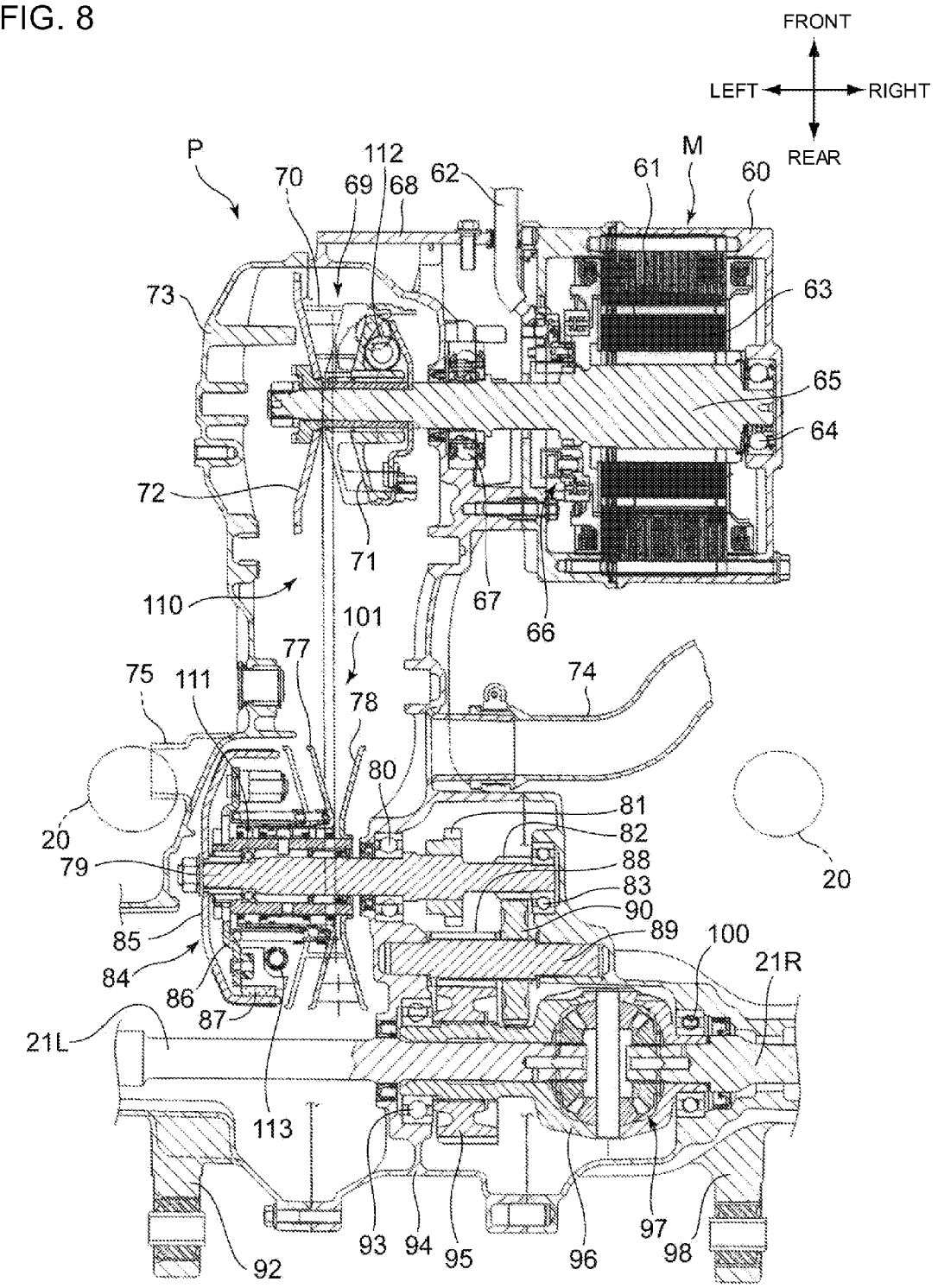
FIG. 8 is a sectional plan view of a power unit according to this embodiment.

FIG. 8 is a sectional plan view of the power unit P according to this embodiment. The power unit P is structured to transmit the rotary driving power of the motor M to the differential mechanism 97 of the rear wheel WR through the belt converter type continuously variable transmission 110 and counter shaft 79.

The inner rotor motor M is comprised of a stator 61 fixed on a motor case 60 and a rotor 63 fixed on a motor output shaft 65. The motor output shaft 65 is pivotally supported by the bearing 67 of a housing 68 and the bearing 64 of the motor case 60. A motor revolution speed sensor 66 for detecting passage of the object being sensed which is attached to the motor output shaft 65, is located on the left of the rotor 63 as seen in the drawing and near the motor output shaft 65. The three-phase cable 62 connected to the PDU 37 to supply power is connected on the vehicle forward side with the motor output shaft 65 between it and the motor revolution speed sensor 66.

A driving variable speed pulley 69, including a fixed pulley half 72 and a movable pulley half 71, is attached to the left end of the motor output shaft 65 as seen in the drawing. As a weight roller 112 moves in the radial direction according to the revolution speed of the motor output shaft 65, the driving variable speed pulley 69 changes the winding diameter of an endless V belt 70 wound between it and a driven pulley 101.

The driven pulley around which the V belt 70 is wound is located coaxially with a driven shaft 79. The driven shaft 79 is supported by bearings 80 and 83 of the housing 68. The driven pulley 101 includes a fixed pulley half 78 and a movable pulley half 77 and changes the winding diameter according to the winding diameter of a driving pulley 155 to change the revolution speed of the motor output shaft 65 at a given gear ratio and transmit it to a cylindrical outer driven shaft 111. The outer driven shaft 111 is journaled to the outside of the driven shaft 79. The power unit P is provided with a ventilation intake pipe 74 and a ventilation exhaust pipe 75 to cool the space surrounded by the housing 68, and a transmission cover 73 in which the belt converter type continuously variable transmission 110 is housed.

A centrifugal clutch 84 is located on the left of the driven pulley 101 as seen in the drawing. While a disc clutch inner 86 is fixed at the left end of the driven pulley 101 as seen in the drawing, a bottomed cylindrical clutch outer 85 is fixed at the left end of the driven shaft 79 as seen in the drawing. When the revolution speed of the driven pulley 101 exceeds a prescribed value, or the revolution speed of the clutch inner 86 exceeds a prescribed value, a plurality of weight rollers 113 move outward in the radial direction by a centrifugal force. In response, a clutch shoe 87 having a friction material touches the clutch outer 85 and the rotary driving power of the clutch inner 86 is transmitted to the clutch outer 85.

The rotary driving power of the driven shaft 79 is transmitted to the counter shaft 89 through the counter gear 90 engaged with a gear 82 formed on the driven shaft 79. The rotary driving power of the counter shaft 89 is transmitted to the differential case 96 of the differential mechanism 97 through an output gear 95 engaged with a gear 88 formed on the counter shaft 89.

In addition, the power unit P can have a parking lock mechanism to prevent the rear wheels WR from rotating during a stop on a slope or the like. A lock gear 81 whose rotation is restricted by the parking lock mechanism is fixed on the driven shaft 79.

Figure 9:
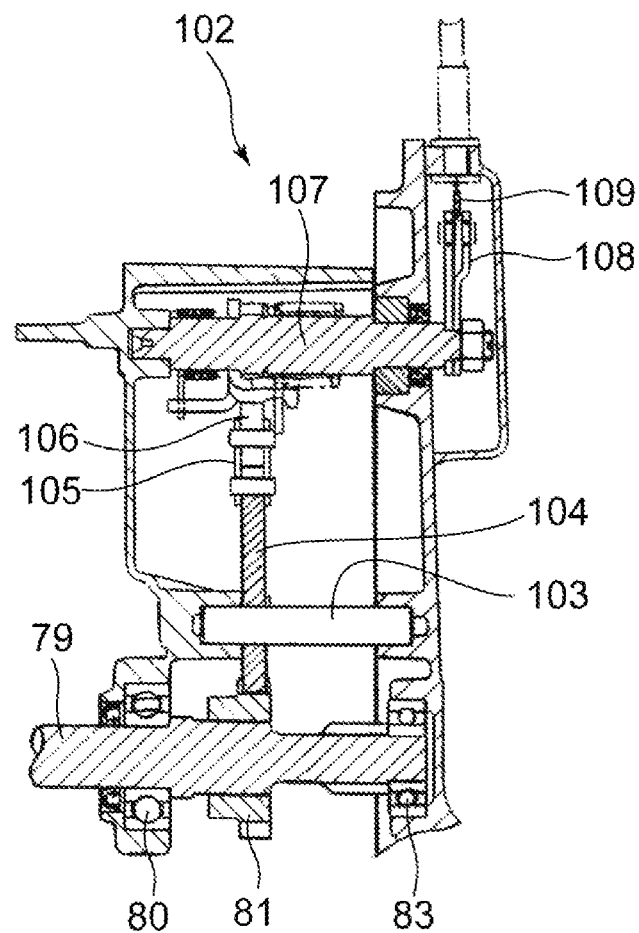
FIG. 9 is a sectional view of a parking lock mechanism.

Referring to FIG. 9, the parking lock works when the protrusion of a lock arm 104, which is swung by manual operation, is engaged with the lock gear 81 fixed on the driven shaft 79. The lock arm 104 is welded or otherwise affixed to a spindle 103 and pivotally supported in a way that the spindle 103 can rotate with respect to the case part. A swing arm 106 which is engaged with the lock arm 104 through a link member 105 is fixed on a swing shaft 107. A working arm 108 which is connected with an operating wire 109 is fixed on the right end of the swing shaft 107 as seen in the drawing.

The differential case 96 (see FIG. 8) is pivotally supported by the bearing 100 of a right case 98 and the bearing 93 of a middle case 94. A left case 92 is fixed on the left of the middle case 94 as seen in the drawing. The differential mechanism 97 has a pair of pinion gears pivotally supported by a pin and a pair of side gears in the vehicle transverse direction, in which a left axle 21L and a right axle 21R are spline-fitted to the respective side gears. The other ends of both the axles 21L and 21R are fixed on the rear wheels WR respectively.

The counter gear 90 and differential case 96 are located so as to overlap each other in a side view of the vehicle in order to make the counter shaft 89 and the differential case 96 as close to each other as possible and reduce the dimension of the power unit P in the vehicle longitudinal direction.

Figure 10:
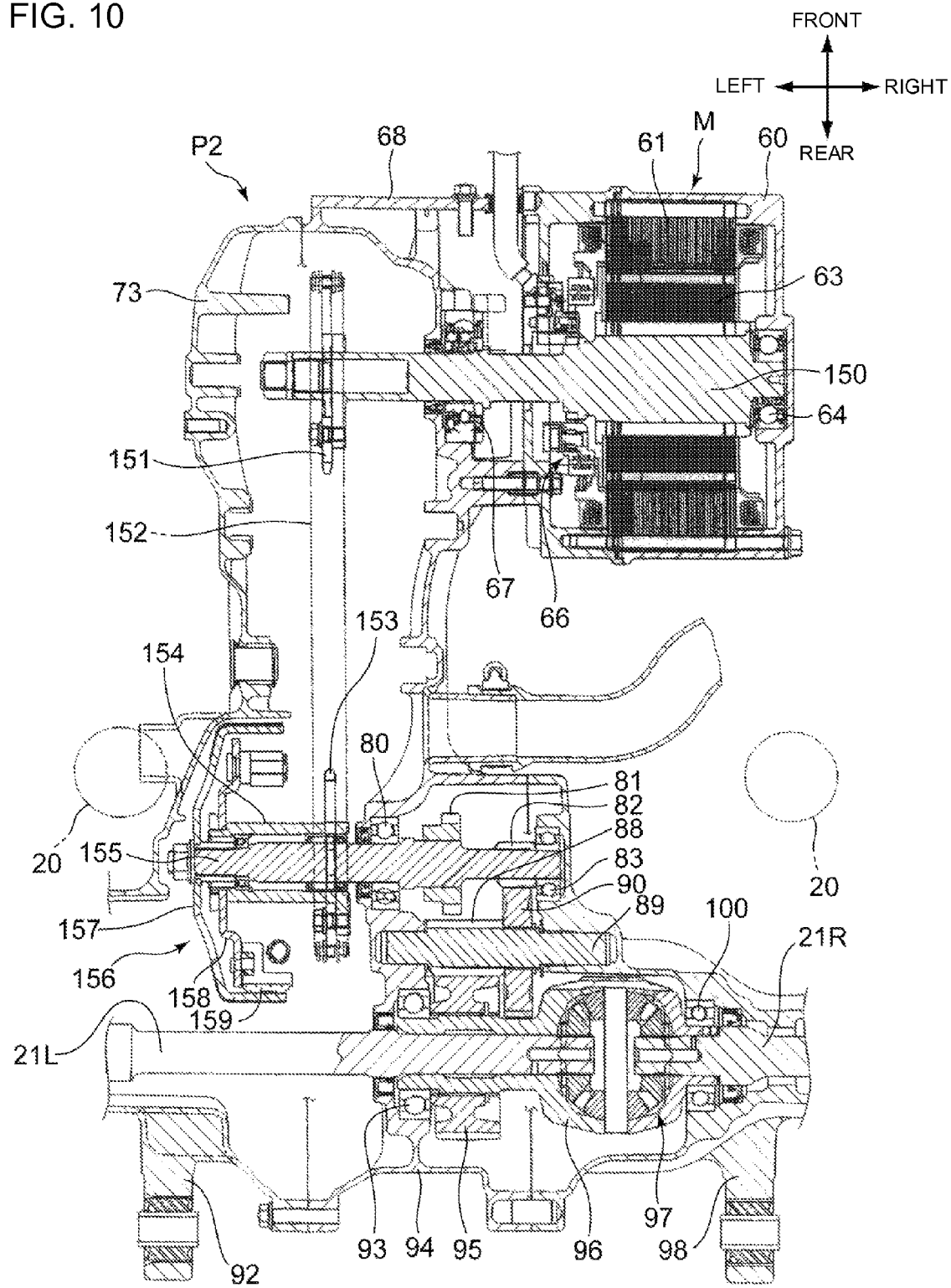
FIG. 10 is a sectional plan view of a power unit according to a variation of this embodiment.
Figure 11:
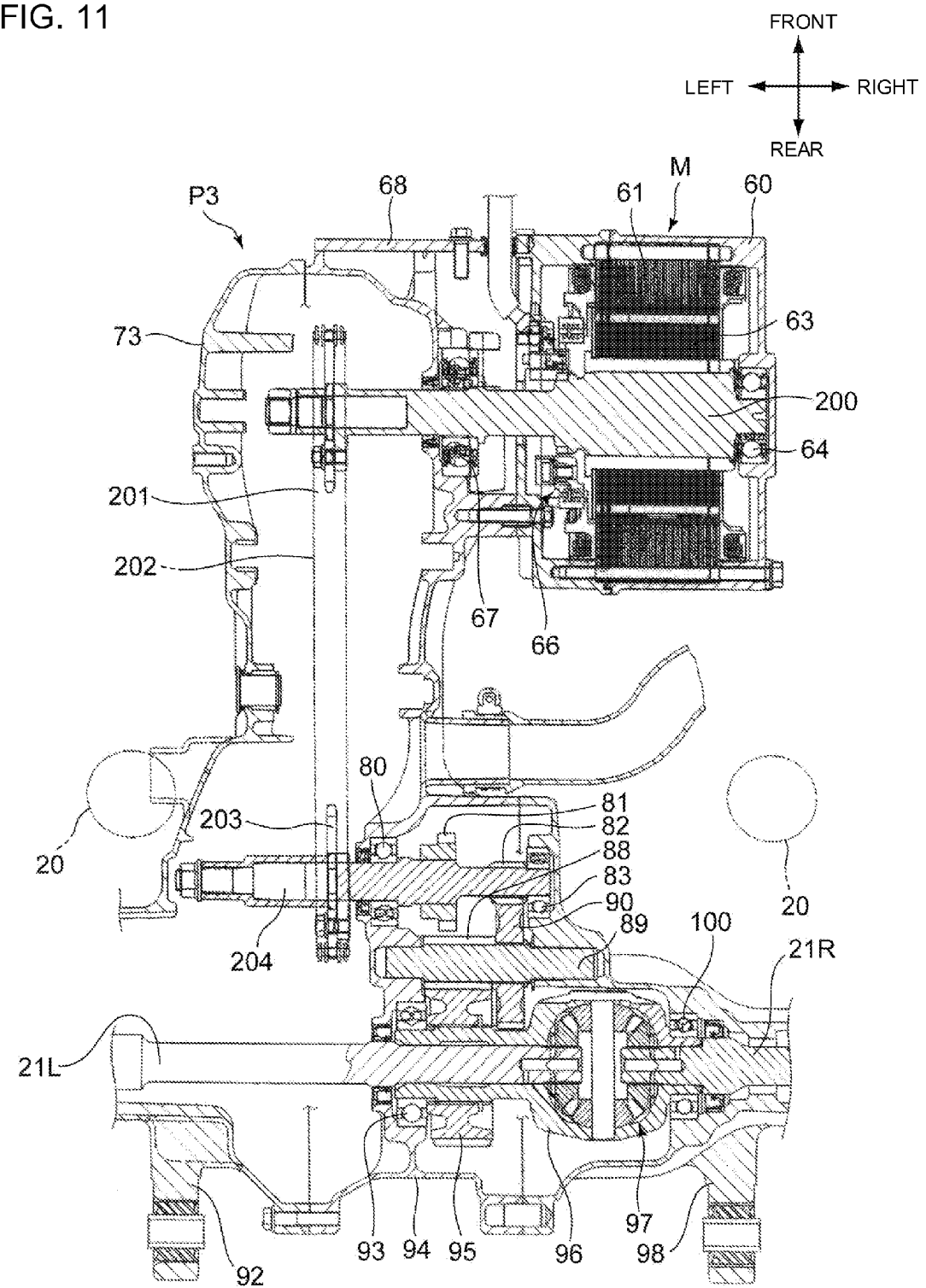
FIG. 11 is a sectional plan view of a power unit according to a second variation of this embodiment.

FIG. 10 is a sectional plan view of a power unit P2 according to another embodiment. Also, FIG. 11 is a sectional plan view of a power unit P3 according to yet another embodiment. The same reference signs as the above denote the same or equivalent elements.

The power units P2 and P3 are modified versions of the above power unit P1 in which only the means to transmit rotary driving power from the motor output shaft to the driven shaft is different. Therefore, descriptions of their elements which are structurally the same as those of the power unit P1 are omitted.

The power unit P2 shown in the embodiment of FIG. 10 uses a chain drive mechanism and a centrifugal clutch 156 for power transmission from a motor output shaft 150 to a driven shaft 155. A drive sprocket 151 around which a drive chain 152 is wound is fixed on the motor output shaft 150. A driven sprocket 153 around which the drive chain 152 is wound on the vehicle rearward side is fixed on a cylindrical outer driven shaft 154 which is pivotally supported on the outside of the driven shaft 155 in a rotatable manner. While a disc clutch inner 158 is fixed at the left end of the outer driven pulley 154 as seen in the drawing, a bottomed cylindrical clutch outer 157 is fixed at the left end of the driven shaft 155 as seen in the drawing. When the revolution speed of the drive sprocket 154 exceeds a prescribed value, a clutch shoe 159 having a friction material touches the clutch outer 157 and the rotary driving power of the clutch inner 158 is transmitted to the clutch outer 157.

The power unit P3 shown in the embodiment of FIG. 11 only uses a chain drive mechanism for power transmission from a motor output shaft 200 to a driven shaft 204. A drive sprocket 201 around which a drive chain 202 is wound is fixed on the motor output shaft 200. A driven sprocket 203 around which the drive chain 202 is wound on the vehicle rearward side is directly fixed on the driven shaft 204 and the rotary driving power of the motor output shaft 200 is directly transmitted to the driven shaft 204.

The vehicle configuration and structure, the shape and structure of the rear body, the structures and sizes of various electric components, the shape of the PDU supporting frame, the shapes of the batteries and battery case, the battery support structure with respect to the battery case, the battery case support structure with respect to the rear body frame and so on are not limited to the above embodiment and may be modified in various ways.

REFERENCE SIGNS LIST

1 . . . Electric three-wheeled vehicle
2 . . . Body frame
3 . . . Main frame
4 . . . Side frame
12 . . . Rear body
16 . . . Pivot shaft
17 . . . Chassis
18 . . . Contactor
19 . . . Rear body frame
20 . . . Rear shock unit
21 . . . Axle
36 . . . PDU supporting frame
35 . . . BMU (battery control device)
37 . . . PDU (motor control device)
42 . . . Monitoring board
48 . . . Battery case
BF . . . Front battery
BR . . . Rear battery
BFL . . . Front bottom face
BRL . . . Rear bottom face
M . . . Motor
P . . . Power unit
WR . . . Rear wheel

The invention claimed is:

1. An electric vehicle, comprising:
a pair of left and right rear wheels configured to be driven by rotary driving power;
a motor supplied with electric power, and configured to provide the rotary driving power;
a rear body comprising rear body frames attached in a transversely tiltable manner with respect to a body frame and a chassis attached to the rear body frames by a pivot shaft on a vehicle forward side in a vertically swingable manner; batteries configured to provide the electric power, the batteries being located on the rear body frames, wherein the motor and the rear wheels are supported on the chassis, and wherein the batteries are housed in a battery case fixed on the rear body frames;
a PDU configured as a battery control device, said PDU being located on a vehicle forward side of the battery case; and
a contactor configured to open and close a connection between the batteries and the PDU, is the contactor being located on a lateral face of the battery case.

2. The electric vehicle according to claim 1, further comprising:
a pair of left and right rear body frames oriented along a vehicle longitudinal direction, wherein the battery case is supportingly held between the left and right rear body frames;
a PDU supporting frame, which is curved in a projecting form toward the vehicle forward direction, and the PDU supporting frame configured to connect the left and right rear body frames,
wherein the PDU is supported by the PDU supporting frame.

3. The electric vehicle according to claim 1,
wherein the chassis is journaled to the rear body frames by the pivot shaft located on the vehicle forward side in the vertically swingable manner, and
wherein the motor is located behind the pivot shaft and in a vehicle forward position of the chassis.

4. The electric vehicle according to claim 1, further comprising a down regulator configured to decrease a voltage of an external power supply to charge the batteries, wherein the down regulator is located under the battery case.

5. The electric vehicle according to claim 4, further comprising:
a lower frame surrounding a lower part of the battery case, the lower frame being located on bottoms of the rear body frames,
wherein the down regulator is attached to the lower frame under the battery case.

6. The electric vehicle according to claim 1,
wherein the batteries include a front battery and a rear battery which are located close to each other in a vehicle longitudinal direction, and
wherein in the battery case, a rear bottom face under the rear battery is higher than a front bottom face under the front battery, whereby the rear battery is in a higher position than the front battery.

7. The electric vehicle according to claim 6, further comprising a down regulator configured to decrease the voltage of the external power supply to charge the batteries, said down regulator being located under the rear bottom face.

8. The electric vehicle according to claim 1, wherein the rear body frames include a charge port bracket configured to mount a battery charge port to be connected with an external power supply to charge the batteries.

9. The electric vehicle according to claim 8,
wherein the contactor is fixed on a contactor supporting stay extending from the battery case in a vehicle transverse direction, and
wherein the charge port bracket is located under the contactor.

10. The electric vehicle according to claim 1, further comprising:
monitoring boards configured to monitor the batteries, said monitoring boards being attached to upper surfaces of the batteries; and
a battery management unit (BMU) configured to collect information from the monitoring boards, the BMU being housed in the battery case on the vehicle forward side of the batteries.

11. The electric vehicle according to claim 1, wherein the PDU is located above a relative rotation part to enable the rear body frames to tilt transversely with respect to the body frame and at front ends of the rear body frames so that a mounting surface of a board housed therein, on which various electric components are mounted, is oriented toward the vehicle forward direction.

12. The electric vehicle according to claim 1, wherein the electric vehicle comprises a three-wheeled vehicle.

13. An electric vehicle, comprising:
a pair of left and right rear wheels for being driven by rotary driving power;
motor means for providing the rotary driving power, said motor means being supplied with electric power;
rear body means attached in a transversely tiltable manner with respect to a body frame and a chassis attached to rear body frames by a pivot shaft on a vehicle forward side in a vertically swingable manner;
energy storage means for providing the electric power, the energy storage means being located on the rear body frames,
wherein the motor means and the rear wheels are supported on the chassis, and wherein the energy storage means is housed in a case means fixed on the rear body frame;
battery control means for controlling the energy storage means, said battery control means being located on the vehicle forward side of the case means; and
contactor means for opening and closing a connection between the energy storage means and the battery control means, said contactor means being located on a lateral face of the case means.

14. The electric vehicle according to claim 13, further comprising:
a pair of left and right rear body frames oriented along a vehicle longitudinal direction, wherein the case means is supportingly held between the left and right rear body frames;
supporting frame means for connecting the left and right rear body frames,
wherein the battery control device is supported by the supporting frame means.

15. The electric vehicle according to claim 13, wherein the chassis is journalled to the rear body frames by the pivot shaft located on the vehicle forward side in the vertically swingable manner, and wherein the motor means is disposed behind the pivot shaft and in a vehicle forward position of the chassis.

16. The electric vehicle according to claim 13, further comprising down regulator means for decreasing a voltage of an external power supply to charge the energy storage means, wherein the down regulator means is located under the case means.

17. The electric vehicle according to claim 16, further comprising:
lower frame means surrounding a lower part of the case means, said lower frame means being located on bottoms of the rear body frames,
wherein the down regulator means is attached to the lower frame means under the case means.

18. The electric vehicle according to claim 13, wherein the energy storage means comprises a front battery and a rear battery which are located close to each other in a vehicle longitudinal direction, and
wherein in the case means, a rear bottom face under the rear battery is higher than a front bottom face under the front battery, whereby the rear battery is in a higher position than the front battery.

19. The electric vehicle according to claim 13, further comprising:
charge port means for being connected with an external power supply to charge the energy storage means; and
charge port bracket means attached to the rear body frames, said charge port bracket means for supporting the charge port means thereupon.

20. The electric vehicle according to claim 13, further comprising:
monitoring means for monitoring the energy storage means, said monitoring means being attached to upper surfaces of the energy storage means; and
battery management means for collecting information from the monitoring means, said battery management means being housed in the case means on a vehicle forward side of the energy storage means.

* * * * *